United States Patent [19]

Klevecz et al.

[11] Patent Number: 4,724,543
[45] Date of Patent: Feb. 9, 1988

[54] METHOD AND APPARATUS FOR AUTOMATIC DIGITAL IMAGE ANALYSIS

[75] Inventors: Robert R. Klevecz, Altadena; Eccles: Beverly A., Duarte, both of Calif.

[73] Assignee: Beckman Research Institute, City of Hope, Duarte, Calif.

[21] Appl. No.: 774,286

[22] Filed: Sep. 10, 1985

[51] Int. Cl.$^4$ ............................ G06K 9/00; G06K 9/52
[52] U.S. Cl. ............................ 382/6; 382/41; 382/49; 382/27
[58] Field of Search ............................ 382/41, 49, 27, 6

[56] References Cited

U.S. PATENT DOCUMENTS

| | | | |
|---|---|---|---|
| 3,106,698 | 10/1963 | Unger | 382/49 |
| 3,832,687 | 8/1974 | Miller | 382/27 |
| 3,879,706 | 4/1975 | Favier | 382/27 |
| 3,993,976 | 11/1976 | Ginsburg | 382/41 |
| 4,224,600 | 9/1980 | Sellner | 364/200 |
| 4,414,685 | 11/1983 | Sternberg | 382/49 |
| 4,523,278 | 6/1985 | Reinhardt | 382/6 |
| 4,590,607 | 5/1985 | Kauth | 358/105 |
| 4,641,356 | 2/1987 | Sternberg | 382/49 |
| 4,644,585 | 2/1987 | Crimmins | 382/41 |

OTHER PUBLICATIONS

Yokoi, Toriwaki, and Fukumora, 'An analysis of topological properties of digitized binary pictures usig local features', Computer Graphics and Image Processing, 4:63–73, 1975.

Primary Examiner—David K. Moore
Assistant Examiner—A. Anne Skinner
Attorney, Agent, or Firm—Edward S. Irons

[57] ABSTRACT

A method and apparatus for digitally analyzing continuous visual images, particularly with reference to the detection of mammalian cell mitotic events is disclosed. The visual images are analyzed by first extracting high frequency picture components, threshold comparison of such components and probing for annular objects indicative of putative mitotic cells. The detection of annulae is performed by an algorithm for recognizing rings of differential radii and compensating for other variations. Thereafter, spatial and temporal relationships between such objects is stored and compared to determine whether cell division occurred.

32 Claims, 8 Drawing Figures

METHOD AND APPARATUS FOR AUTOMATIC DIGITAL IMAGE ANALYSIS

BACKGROUND OF THE INVENTION

1. Field of the Invention

This invention relates generally to image processing and, more specifically, to automated digital image processors useful for the identification of dividing cells for the examination of various biological cellular events.

2. Prior Art

Much of the experimental work in the field of cell and molecular biology of cultured cells involves the assay of the proliferative activity of these cells. This is especially true for problems in biological time, rhythmicity and time sense which require for their resolution continuous surveillance and frequent data acquisition.

Critical to such work is an accurate count of incidents of mitosis, or cell division, in a cell culture. Incidents of mitosis are easily identified because mitotic cells in culture tend to round up and become refractile and annular in appearance under phase contrast illumination. Thus it is possible for a human observer to count incidents of mitosis by observing the cell culture under such illumination.

Up to the present time, all of this information has been collected by researchers by hand without the extensive use of computers. This is a particular problem because the need for extensive observation of the growth of cells in such cultures makes human observation an inconveniently long and tedious process in a laboratory setting. In addition, such observation requires a high degree of accuracy, and consequently several observers must be used to insure such accuracy.

One present method for performing such experiments is to place a plated culture of cells under a microscope under phase contrast illumination, and to record the microscopic images over time using a video tape recorder having time lapse videophotography capability. The time at which each cell divided, or more typically, elapsed time from a predetermined event can be determined from the videotapes. This information has been provided by a digital clock which generates a time signal that is superimposed on the viewing video screen. Thus, the number of cells dividing during the experiment, and the time at which each division occured can be obtained. A 48:1 time compression is generally used so that a 48 hour recorded observation can be viewed in one hour. Of course, since multiple events may occur on the screen at the same time, an observer may be required to review the tape a multiple number of times to observe all mitotic events. Thus, the review of a 48 hour tape may easily take eight hours or longer for a skilled human observer to complete.

What is required is an automated means for recording these incidents of mitosis which is rapid, automated, and non-perturbing. This last criteria is particularly important in research involving rhythmicity and time sense. As disclosed below, the present invention provides such a means. Such an automated system permits continual observation of cell cultures over extended periods of time that was not available under the manual methods of the prior art. The use of such automated system would make such data handling and analysis faster and significantly more accurate, and further would enable the researchers to derive additional information from such experiments which have heretofore been very difficult to obtain on a large population of cells, because of the difficulty in tracking individual cells and their progeny on a large scale.

SUMMARY OF THE INVENTION

The present invention provides methods and apparatus which are used in conjunction with a digital computer system to identify and record events in a binary representation of a visual image. Specifically, algorithm means are provided whereby incidents of mitosis in a cell culture can be identified by image analysis techniques.

Images are obtained using a video camera in combination with a microscope and low intensity phase contrast illumination to observe a cell culture. The signal from the video camera is then periodically sampled. The sampled signal is then digitized and the relevant detail extracted. The phase contrast halo which surrounds potentially mitotic cells is recognized using a series of transformations of the digitized image. The temporal and spatial relationships of the cell groupings from successive images are then analyzed to determine if mitosis has in fact occurred, and if so this fact is recorded.

By utilizing a series of transformations to identify the halo surrounding the mitotic cells, only the digital image information in the region immediately surrounding the specific cells is analyzed. In addition, the coordinates of each ringed (mitotic) cell identified, along with other relevant information, is recorded in a list in memory as each image frame is processed. In this way, detection of mitosis between pairs of cells which appear at different times is facilitated because the entire digital image from each frame does not need to be compared with all the others at the end of the observation period. All that is required is cross-comparison of the information stored in the list in memory to identify mitotic cell pairs.

The preferred embodiment of the present invention provides a means for electronically viewing an image, most advantageously a microscope fitted with a standard newvicon video camera. Also provided is a digital image processor for conversion of the video signal to digital information. This processor is most advantageously coupled to a general purpose digital computer. The digital computer performs the analysis of the digital image produced by the image processor. Algorithm means are provided both to transform the digital image (or portions thereof) within the processor memory and to detect an actual event of mitosis. Detected incidences of mitosis are recorded in computer mass storage memory for later display on a standard device, such as a cathode ray tube (CRT) or printer.

DETAILED DESCRIPTION

Notation and Nomenclature

Figure 1:
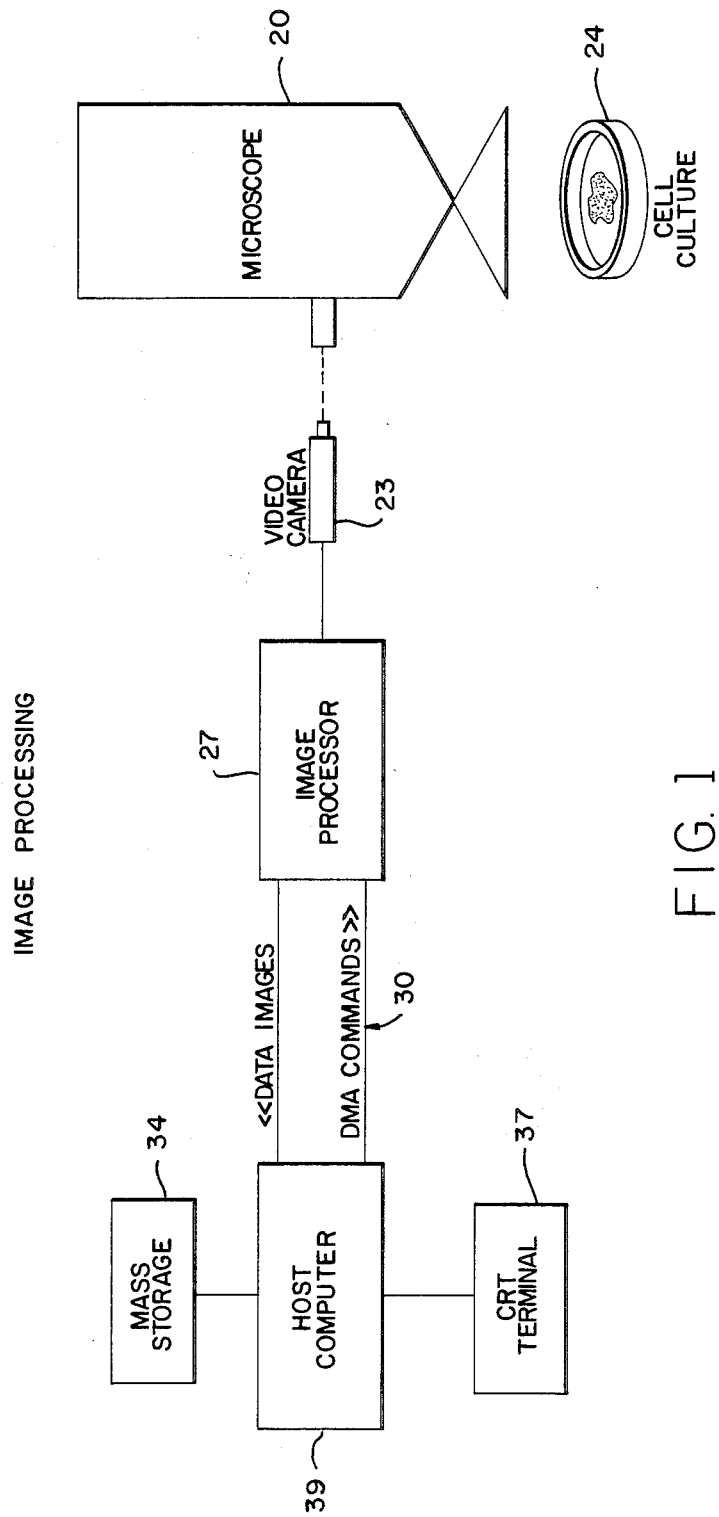
FIG. 1 is a block diagram of the present invention.

The detailed descriptions which follow are presented largely in terms of algorithms and symbolic representations of operations on data bits within a computer memory. An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

The specific algorithms described below are most conveniently expressed using the formal notation of morphology, a mathematical analysis which embodies sets in digital space. This formalism provides a concise mode of presentation by repeated reference to a physical model of a digital image composed of stacks of boxels (cubes). A two dimensional picture represented by a rectangular array of pixels, each with a distinct gray value, would thus be modelled by a three dimensional solid where, at each Cartesian x,y-coordinate there is a stack of boxels (stacked in the Cartesian z-direction), the height of which corresponds to the gray value of the picture (0–255) at that coordinate. In the following dictionary of terms, X and Y refer to sets and x and y to boxels. When Cartesian directions are meant, they will be explicitly so labelled. Image analysis amounts to set transformations, where the elements of the sets are the discrete image boxels. A more detailed description of the notation of morphology can be found in the comprehensive text by J. Serra, *Image Analysis and Mathematical Morphology*, London, Academic Press, Inc., 1982.

For the purpose of understanding the present invention, the following notations will be used, which notations have the respective meanings set forth below.

x a boxel
X a set of boxels
$x \in X$ set membership; boxel x belongs to set X
$X \subset Y$ set X is included in set Y
$X \cap Y$ set intersection; set of boxels belonging to both set X and set Y
f numerical function defining the gray value at each Cartesian x,y coordinate of the picture; they may be thought of as a three dimensional surface defining the upper contours of the three dimensional boxel model.
$X_t(f)$ the family of two dimensional sets, called sections, composed of the boxels present at height t, for $0 \leq t \leq 255$. The family of such sets taken as a whole comprises the umbra of the function and generates the function.
$X \oplus B$ dilation of set X by structuring element B (also a set). For a two dimensional set, for example: translate B to every image point in turn. If any element of B hits (touches, overlays) any element of X then mark the hit at the image point corresponding to the current position of the origin of the structuring element. The set of such marks represents the dilated set. For example, for an X,  and a B,  with its origin at the center,
```
  1 1 1         1
  1 1 1       1 1 1
    1           1
```

$X \oplus B$ is
```
    1 1 1
  1 1 1 1 1
  1 1 1 1 1
    1 1 1
      1
```

For a three dimensional set such as the umbra of a function f, dilation by a two dimensional structuring element, in principle, is accomplished by applying the two dimensional dilation to each $X_t$ in the family of $X_t$'s, $0 \leq t \leq 255$ for the function f. The result is a new family of sets, $X_t(f \oplus B)$, which are the sections of the function (the picture) dilated by the two-dimensional structuring element B. In practice, the dilation for a picture is accomplished by first considering the surface defined by the topmost boxels (the function f) to be an impenetrable barrier. The structuring element then roams about above the surface: at each image Cartesian x,y coordinate the structuring element is lowered until it first hits the surface at any boxel; the height of the origin of the structuring element is noted at that particular Cartesian x,y coordinate; the picture thus calculated is the dilated picture. The manner of computing this is straightforward. Each pixel in a picture is replaced by the maximum gray value found at relative positions in its immediate neighborhood which correspond to similar relative positions of the structuring element.

f−g difference to two functions; the resulting function is a picture (no negative gray values) if and only if $X_t(g) \subset X_t(f)$, where $0 \leq t \leq 255$ (i.e., $g \leq f$ at every Cartesian x,y coordinate).

$X_t(f) \cap X_t(g)$ intersection of the sections of two pictures; this is computed by taking the minimum value, pixel-by-pixel in comparing pictures f and t. The sections of the resulting picture will be the desired set intersection.

The following description is divided into several sections. The first of these will discuss the general configuration of a system for processing digital images. Later sections will address specific aspects of the present invention, such as extraction of the relevant detail, identification of the phase contrast halo by image transformations, and analysis of the relationships between identified cells to detect mitosis.

GENERAL SYSTEM CONFIGURATION

FIG. 1 shows a typical computer-based system for image processing according to the present invention. Conversion of optical images to electronic signals is accomplished by the combination of a standard newvicon video camera 23 and a microscope 20 utilizing low intensity phase contrast illumination. This video camera and microscope are representative of generally available video and optical equipment for scientific use. In the system utilized by the inventors, the camera and microscope optics together result in a 600× magnification. Of course, it will be generally recognized that the magnification is a function of the type, and particularly the size of the cells used. In the present embodiment, the microscope and camera combination are used to observe mitosis in cell culture 24.

Figure 2:
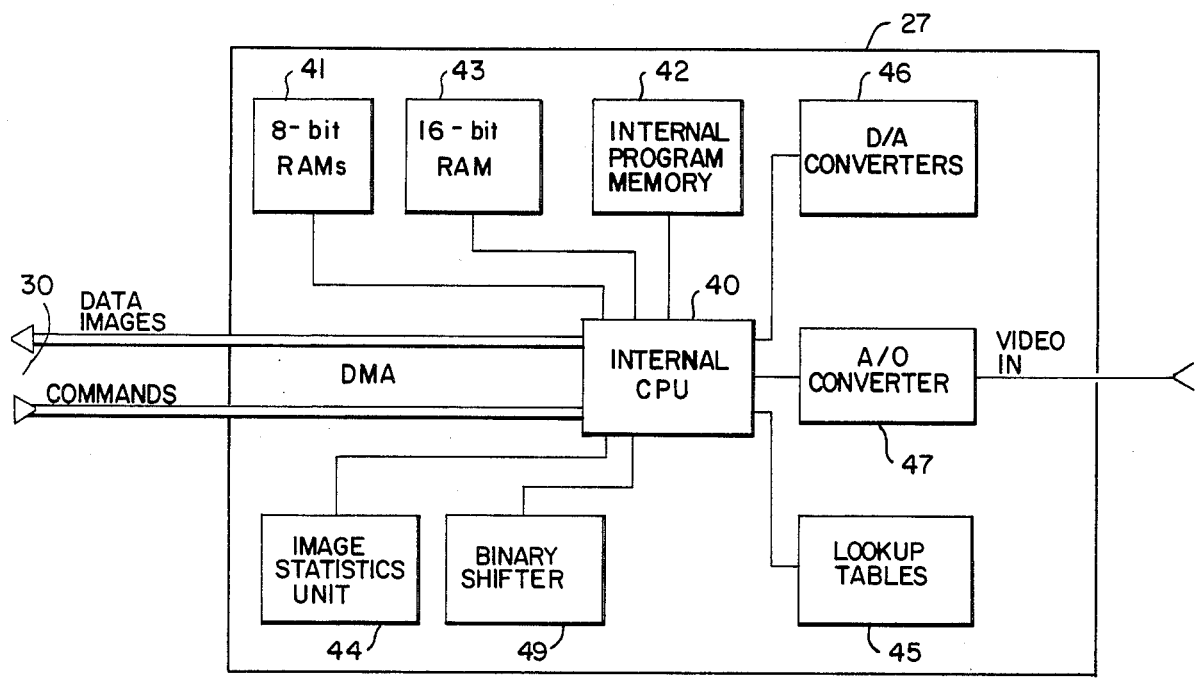
FIG. 2 is a block diagram of a digital image processor used in the present invention.

The video signal generated by camera 23 is coupled to digital image processor 27, shown in detail in FIG. 2. This image processor contains several internal elements for processing the incoming video signal and converting said signal to digital form. These elements include an internal processor (CPU) 40, capable of controlling all the internal components of the image processor, accepting commands from an external host computer, and transmitting a video signal, in digital form, to such host computer. An internal program memory 42 is included for storage of instructions and routines received from the host computer. The image processor also contains two look-up tables 45, two digital-to-analog converters 46, one 8 bit (256 possible gray levels) analog-to-digital converter 47, a binary shifter 49 and an image statistics unit 44.

Also shown are two 8-bit random access memories (RAMs) 41, and a 16-bit RAM 43. These RAM memories are used to store both raw (unprocessed) and processed digital image data, as well as other data derived during the analysis of the images. FIG. 3b shows a typical arrangement of 8-bit RAMs 41, including an Image Pixel Array 52 and a Degree of Closure Array 45, both used in processing the image as described in more detail below, space for the raw image data 57 and space for other data and spare memory 59.

The image processor shown is intended to be representative of the general class of devices for processing such signals under host computer control. A particular example of a suitable image processor is the EyeCom III model image processor manufactured by DBA (from Florida). Other image processors having similar capabilities are easily adapted for use in the present invention.

Digital information representing the processed video signal is transferred from the image processor to host computer 39 via direct memory access channel 30 (the "DMA"). These two elements are typically found in most general purpose computer systems and in many specialized computer systems. Any of numerous, easily available, data processors which provide for DMA are readily adaptable to use as shown.

Also shown in FIG. 1 is a mass storage device 34 connected to host computer 39. This mass storage device may be any of a number of available devices, including magnetic tape, magnetic disk, paper tape or cards. The data retained in mass storage 34 may be transferred to and from host computer 39. Such mass storage is used to augment the internal memory of host computer 39 and to provide for permanent storage of data. A CRT terminal 37 is also shown coupled to host computer 39. This terminal is used to permit an operator to enter commands and to allow data collected by host computer 39 to be displayed. It should be noted that any device capable of exchanging character level data with the host computer may be used in place of the CRT terminal 37, including a printer or another computer.

Figure 3A:
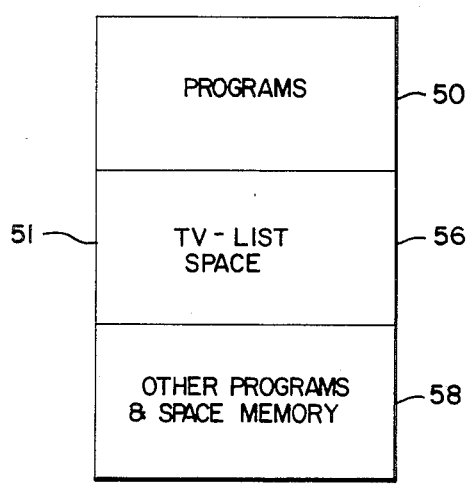
FIG. 3a illustrates a typical arrangement of the memory in the internal RAM of the host computer in the present invention.
Figure 3B:
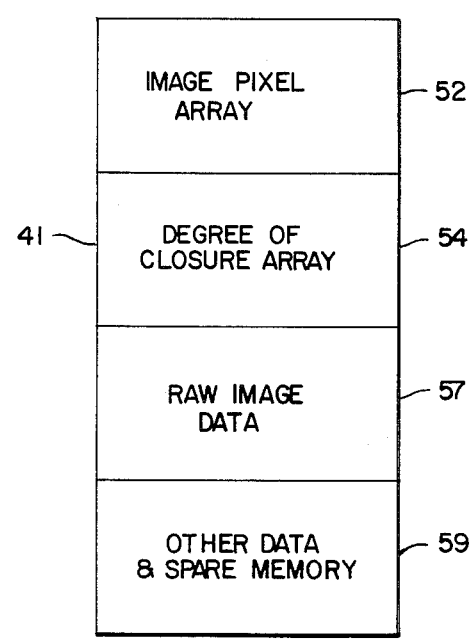
FIG. 3b illustrates a typical arrangement of a segment of the memory in the digital image processor of the present invention.

Host computer 39 contains an internal RAM memory 51 to store programs and data, as shown in FIG. 3a. The typical arrangement of the major portions of memory 51 are also shown in FIG. 3a. Space is provided for programs 50 which represent a variety of sequences of instructions for execution by the host computer, including instructions for implementing the operations and routines described herein, monitor and control programs, disk operating systems and the like. Memory space is also reserved for a Temporal Vicinity List ("TV-list"), which contains the subset of image data necessary to detect incidents of mitosis, in TV-list space 56. Additionally, space within memory 51 is reserved for other programs and spare memory as designated at 58. These other programs may include a variety of useful computational or utility programs as desired.

DIGITIZATION AND DETAIL EXTRACTION

The combination of microscope 20, camera 23 and image processor 27, shown in FIG. 1, provides a digital representation of the image consisting of 640×480 picture element (pixel) frames. Each pixel in a frame contains a value corresponding to the gray level detected by the camera at that point. In the typical embodiment of the present invention shown, 256 possible gray levels, ranging from white to black, are available. In the preferred embodiment of the present invention, the camera and microscope optics together provide a resolution of 0.9 micron/pixel. Image operations on the frames occur at the standard video rate of 30 frames/second.

The present invention achieves real time image analysis by sampling and digitizing the live video input from the cell culture once each minute. Thirty-two successive video frames are sampled, averaged and the result is stored in 8-bit RAMs 41 (FIG. 3b) contained in image processor 27 (FIG. 1). Transformation and analysis of this stored image is accomplished, as described below, by image processor 27 under instructions from host computer 39 transferred via DMA 30 (FIG. 1).

The desired image features, specifically the phase contrast halos surrounding potentially mitotic cells, are extracted by subtracting a transformed image, "g", from the original image, "f". This transformation is accomplished by successivly dilating the original image f (treated as a two-dimensional set) by a structuring element, "B".

Figure 4:
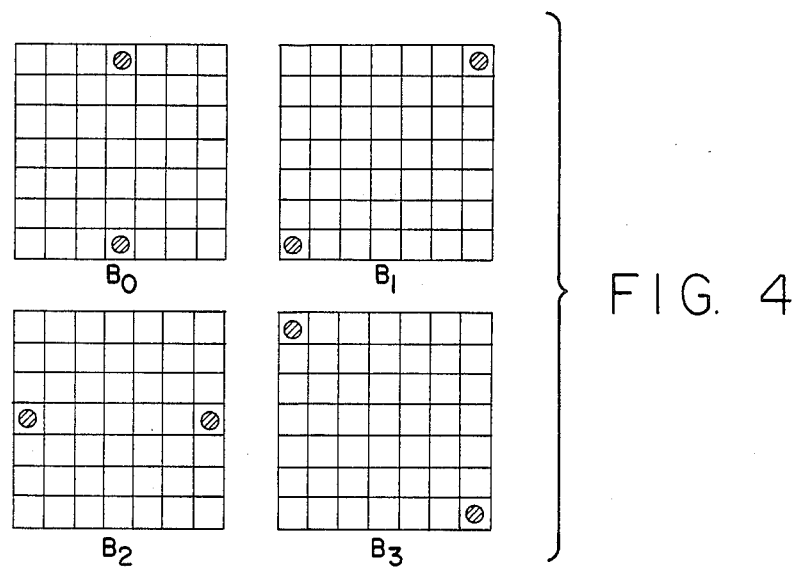
FIG. 4 illustrates the four structuring elements used to make a grey image ridge extraction as contemplated for the present invention.
Figure 7:
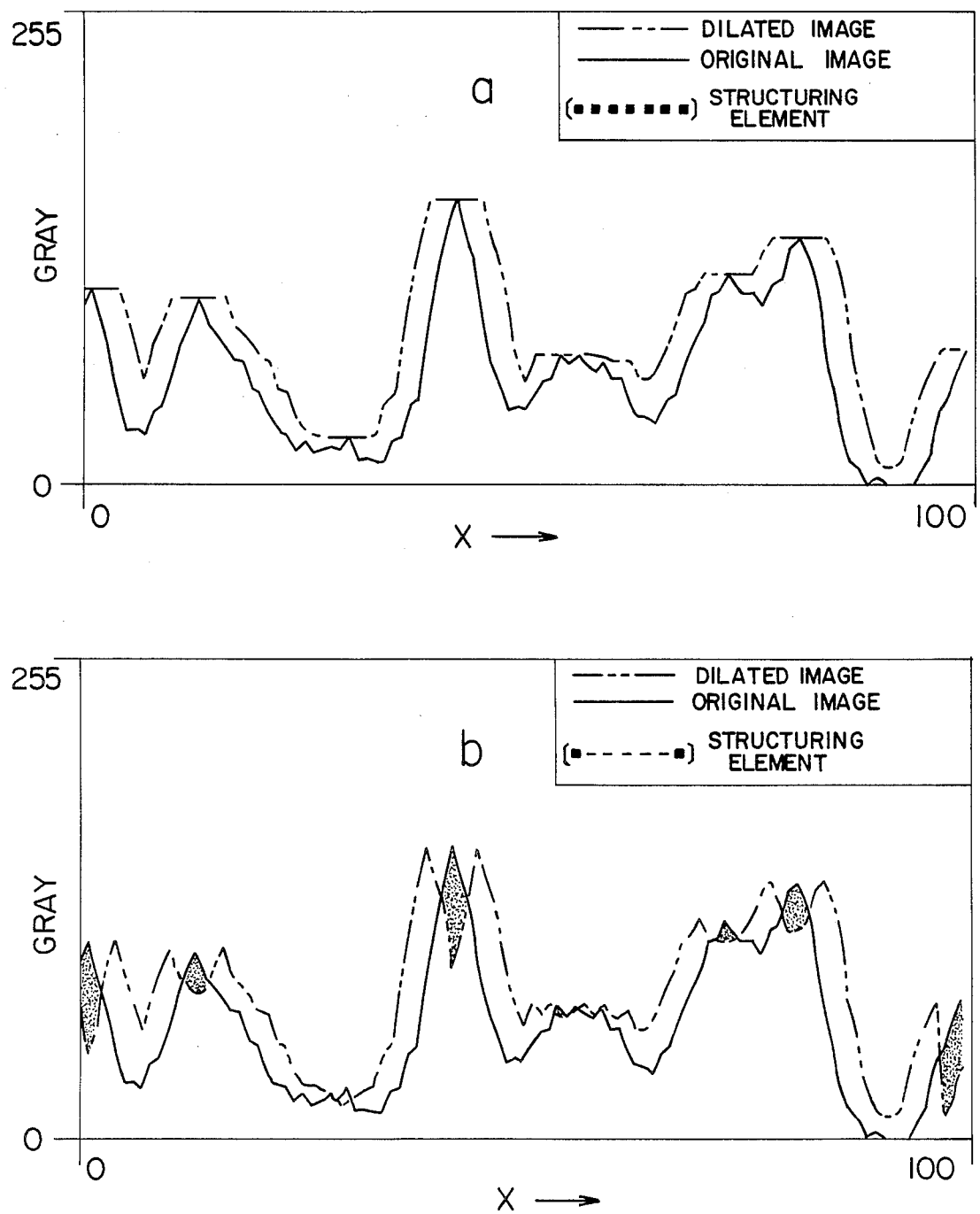
FIG. 7 illustrates the dilation of an image by a structuring element.

To perform the dilation, a series of four structuring elements, B0–B3, are used as shown in FIG. 4. The effect of gray image dilation can be visualized by taking the gray values to define elevation of a terrain in the Cartesian z direction, if one considers the image plane to lie in the Cartesian xy plane. Over each pixel, the origin of the structuring element is centered and the structuring element is then lowered, without tilting, until it first contacts the terrain. The elevation of the origin of the structuring element at that first contact is taken to be the gray value at that pixel in the dilated result. This process for a one-dimensional image using a one-dimensional structuring element without holes can be seen by viewing such an image in profile in FIG. 7a. Dilation results in a picture with gray values at every pixel either greater than or equal to the corresponding gray value in the original picture. Compare the dilation in FIG. 7a with the result obtained by using a structuring element containing a hole, FIG. 7b. It can be seen from FIG. 7b that peaks in the original profile are distinguished as being those regions where pixel gray values decrease (shaded regions) rather than increase upon dilation. In other words, a place in the image where the structuring element can be lowered to first contact and consequently straddle a piece of the image with a higher elevation is a peak in the image. Returning to a discussion of two-dimensional images: image features such as ridges and peaks would be lowered upon dilation by one or more of the structuring elements $B_N$. Different orientations of the structuring element $B_N$ are required to sense ridges oriented at different angles in the xy image plane. At each pixel the minimum value for each of four dilations, using these structuring elements is recorded, i.e. the result of the intersection taken over the variable N in the following equation:

$$X_t(g) = X_t(f) \cap \bigcap_{0 \leq N \leq 3} X_t(f \oplus B_N)$$

The intersection of the umbra of the new image with that of the original is computed in order to assure that $X_t(g) \leq X_t(f)$. The number of pixels in the interval between the two elements of each $B_N$, is determined by the two-dimensional thickness of the phase contrast detail of interest.

The transformed image g subtracted from the original image f produces a ridge-extracted picture. This new image provides greater clarity by displaying only the objects of interest from the original image, in the present embodiment the phase contrast halos around cells.

The ridge-extracted picture produced above is then converted to a binary picture using a technique known as "threshold comparison". This technique involves comparing the gray level representation for each pixel with a selected threshold value. For each pixel with a value less than the threshold value, the gray level value for that pixel is replaced with the value zero. For each pixel with a gray level value greater than or equal to the threshold value, the value for that pixel is replaced with a fixed, nonzero value. In the preferred embodiment of the present invention, a threshold gray level value of seven is used, and a value of 128 is chosen to replace the value for all pixels greater than or equal to the threshold. The result of this threshold comparison technique is to increase the detail and clarity of the image.

RING SHAPE RECOGNITION

The present invention provides for analysis of the image which has been transformed and undergone threshold comparison described above utilizing instructions from host computer 39 transferred to image processor 27 via DMA 30 (FIG. 1). A cyclic series of transformations is performed on the image in order to detect the presence of annular objects corresponding to the phase contrast halos of the mitotic cells. Each of the transformations performed probes for a thin annulus of specific radius. In the preferred embodiment of the present invention, the radii probed range from five to ten pixels. Each transformation in the series consists of two steps, annulus transformation (A-transformation) followed by ring-toss transformation (RT-transformation), described as follows.

In the A-transformation, to probe for an annulus of radius "r", a one-pixel wide annular mask of such radius is centered at each pixel. The degree of concidence of the mask with white objects in the image (gray value 128) is computed by summing the pixels covered by the mask, and dividing by the number of pixels in the mask. This value is then stored at the location of the central pixel for the ring in 8-bit RAM 41 (FIG. 3b). In the A-transformed image, objects which originally approximated annuli of radius r appear as locally bright spots having a brightness which indicates a degree of ring closure. The A-transformation may be expressed as follows:

$$f_A(x) = \frac{1}{P} \sum_{1 \leq i \leq p} f(x - h_i)$$

where the $h_i$ represent all discrete orientations of a translation vector of length r radiating from a common point (hence described as a one-pixel-wide annulus) and p represents the finite number of such vectors.

Such A-transformation is carried out once for each radius probed. In the preferred embodiment this ranges from five to ten pixels, requiring six A-transformations. Each A-transformed image is used to update the Degree of Closure Array 54. Updating is performed using a MAXIMUM operation, where pixels in the A-transformed image are compared with elements stored in the Degree of Closure Array 54. If the value stored at a given pixel in the A-transformed image is greater than the value stored in the Degree of Closure Array, the value in the array is replaced by the larger value. This operation results in each element in Degree of Closure Array 54 containing a value representing the Degree of Ring Closure for annuli surrounding the object centered at the pixel with corresponding coordinates in 8-bit RAM memory 41 (FIG. 3b). Information stored in this fashion is utilized for subsequent data interpretation, as described in the next section.

Figure 5:
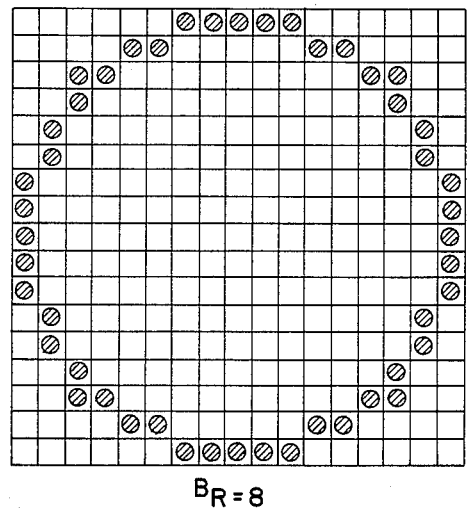
FIG. 5 illustrates a two-dimensional thin-ring-shaped structuring element used in the RT-transformation.

Following each A-transformation, an RT-transformation is performed to extract the local maxima in the A-transformed image. This RT-transformation involves subtracting from the A-transformed image an image calculated by dilating the A-transformed image by a two-dimensional thin-ring-shaped structuring element, $B_R = 8$, shown in FIG. 5. The appropriate radius of the ring is dependent upon the thickness of the rings themselves in the original picture. In the preferred embodiment, a radius of eight pixels has proved to be effective. After this subtraction is performed, only pixels contained by the $B_R=8$ structuring element remain. The RT-transformation is expressed as follows:

$$f_{RT}(x) = f_A(x) - g(x)$$

where g(x) is given by:

$$X_t(g) = X_t(f_A) \cap X_t(f_A \oplus B_R = 8)$$

The image resulting from this RT-transformation is then subjected to threshold comparison, according to the above described method to isolate significant maxima remaining after the RT-transformation. In the preferred embodiment, this threshold comparison is performed using a threshold value of gray level 50.

Upon completion of each cycle of A-transformation followed by RT-transformation and threshold comparison, the resulting binary image is used to update Image Pixel Array 52 using a bit-by-bit logical OR operation.

Upon completion of the series of transformations for all desired radii, the binary image of significant maxima, stored in Image Pixel Array 52 is thinned to isolated pixels using a fourpass algorithm based on connectivity number as described in Yokoi, S., Toriwaki, J-I, Fukumara, T.; "An analysis of topological properties of digitized binary pictures using local features", Computer Graphics and Image Processing 4: 63–73, 1975: The coordinates of the residual bits remaining in Image Pixel Array 52 (FIG. 3b) after thinning are determined and passed to the host computer program 50, along with the degree of ring closure corresponding to each such residual stored in the Degree of Closure Array 54. These data together with the actual time (wall clock time) are then recorded on mass storage device 34, and, in addition, analyzed for spatial and temporal relationships to discern mitotic events as described below.

DETERMINING MITOTIC EVENTS

In order to detect a mitosis, it is necessary that both daughter cells be detected, though not necessarily in the same video frame. A time invariant handicap to this end is that mitotic cells tend to lie in a slightly different focal plane than nonmitotic cells. This is easily corrected by offsetting the focal adjustment of the microscope. Not all mitotic cells, however, are clearly in focus due to their tendency to float, and hence some daughters are overlooked on this basis. Moreover, aggregates of cells pose the problem that the phase contrast halo around each cell becomes discontinuous at the points of contact with other cells. Some allowance is made for this fact, at the expense of accepting some artifacts. The number of artifacts and oversights per frame roughly increase with the degree of cellular confluency. Artifacts can be eliminated to some degree at the level of the decision rules whereby temporal and spatial relationships are discerned. An artifact really only poses a problem when it appears in the vicinity of true mitotic cells, or another artifact, where it might be mistaken for a daughter cell, and falsely imply a mitotic event.

The decision rules are limited in their success by the success of the image analysis algorithms in recognizing all the relevant annular objects in the processed pictures. The rules must make sense out of the motion picture of constellations with which they are presented. As one skilled in the art will appreciate, it is difficult to account for all possible orientations of putative mitotic cells on a background of false positives, and hence a sufficiently general set of rules which will produce results which preserve the essence of the proliferative behavior of the population have been developed.

Figure 6:
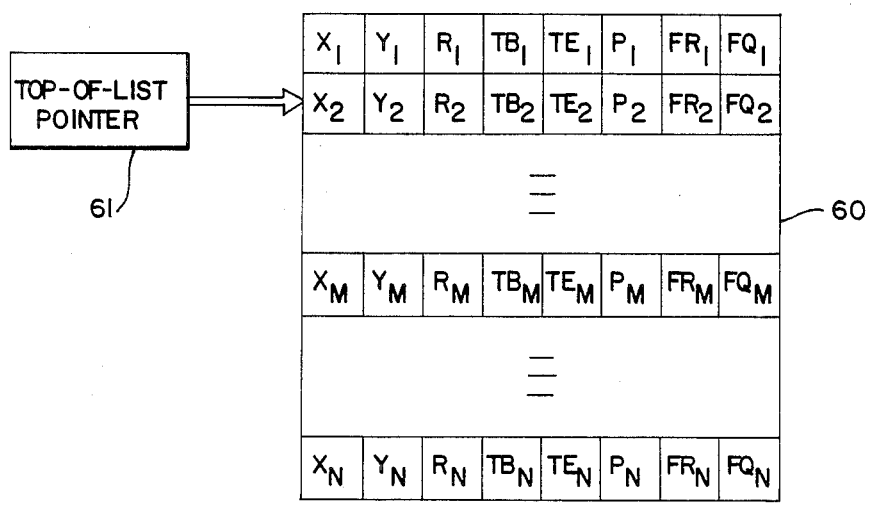
FIG. 6 illustrates the data structure for application of decision rules for mitotic events.

The above described image analysis procedures produce raw data in the form of image coordinates and the degree of ring closure for annuli in each video frame sampled. Such raw data is both stored permanently on mass storage device 34 for later reference and interpreted by analyzing temporal and spatial relationships between annular objects to detect a pair of annular objects representing a pair of cells undergoing mitosis. In discerning these relationships, only a subset of the data need be considered, specifically the data for those annuli detected in the temporal vicinity of the current video frame being analyzed. This subset of data is retained in the host computer memory 51 (FIG. 3a) in a list data structure using a dynamic array as shown in FIG. 6. Each node in this Temporal Vicinity List (TV-list) 60 consists of the of the following data items:

X, Y picture coordinates of annulus center
R degree of ring closure
TB time this annular object first noted
TE time this annular object last noted
P index of partner if this annular object is paired with another
FA flag: indicates whether node is currently active; once the record of an annular object ages sufficiently it is deactivated and its node is freed for re-use.
FQ flag: indicates whether node is qualified for consideration as a partner to another annular object.

TV-list space 56 (FIG. 3a) is reserved for this TV-list 60 in an amount sufficient to accomodate N data nodes. In the presently preferred embodiment N is set at 180 to accomodate interpreting up to 180 active annular objects at any time, though N may be adjusted upward or downward as desired or limited, of course, by available memory space in the host computer. A top-of-list pointer 61 (FIG. 6) is maintained to facilitate searching the TV-list in which deactivated, or freed, nodes may be re-used.

Upon obtaining the image coordinates and Degree of Ring Closure of annular objects in the current video frame, the following steps are executed. First the TV-list 60 is updated. For each annular object detected in the current video frame a search is conducted for an annular object entry in the TV-list 60 whose coordinates are within seven pixels distance. If none is found the new annular object is added to the TV-list. If such an annular object entry is found, then the X,Y,R, and TE fields of that entry are updated to reflect the new object.

Second, the TV-list is scanned to retire nodes which have aged sufficiently. In the presently preferred embodiment nodes for those objects detected more than 15 minutes prior to the current video frame are retired. If two annular objects have been paired (representing a possible daughter pair resulting from an incident of mitosis) then both nodes must meet the age criterion noted above before either can be retired. At such a time, the pair is considered a definite indication of a mitotic event and the event is taken to have occurred at a time corresponding to the greater (later) TB of the two annular objects involved. Retirement of an annular object node amounts to recording the data from that node on mass storage 34 and then clearing the FA flag.

Finally, active annular objects from the TV-list are paired to discern possible daughter cell pairs indicating a mitotic event. Annular objects within 20 pixels of each other are considered. In the event that more than two annular objects clustered together, pairs are formed between the nearest annular objects. Before two annular objects can be paired by spatial proximity, both must meet a criterion of minimum degree of ring closure else the pairing is disqualified from ever being considered. Any pairing is considered tentative until such a time as both members are considered eligible for retirement. Until that time, pairing may be revised upon detection of new annular objects in the neighborhood of existing ones.

A record of mitotic events is stored permanently on mass storage device 34. Upon completion of the analysis of the entire set of frames, the mitotic activity is summarized by plotting a histogram of the events employing a user-selected bin size. Such plot is displayed on CRT 37 in the preferred embodiment.

It is important to note that all disclosed parameters relating to spatial and temporal relationships between annular objects are completely adjustable. These parameters may be set, as desired, to provide accurate monitoring of types of activity other than incidents of mitosis. By adjusting these parameters the present invention may be applied to monitoring various events, both biological and otherwise, observable via video camera 23 (FIG. 1).

CODING DETAILS

No particular programming language has been indicated for carrying out the various procedures described above. This is in part due to the fact that not all languages that might be mentioned are universally available. Each user of a particular computer and image processor will be aware of the language which is most suitable for his immediate purposes. In practice, it has proven useful to substantially implement the present invention in ANSI-77 standard Fortran.

Because the computers and image processing systems which may be used in practicing the instant invention consist of many diverse elements and devices, no detailed program listings have been provided. It is considered that the operations and other procedures described above and illustrated in the accompanying drawings are sufficiently disclosed to permit one of ordinary skill in the art to practice the instant invention or so much of it as is of use to him.

Thus, methods and apparatus which are most advantageously used in conjunction with a digital computer and image processor to provide automated recording and analysis of cell mitosis and other cellular events have been disclosed. The present invention's use of A-transformations, RT-transformations, threshold comparison, and the above-mentioned decision criteria permit automation of a task which could only be accomplished manually under the prior art.

While the present invention has been particularly described with reference to FIGS. 1-6 and with emphasis on certain computer systems and image processing systems, it should be understood that the figures are for illustration only and should not be taken as limitations upon the invention. In addition, it is clear that the methods and apparatus of the present invention have utility in any application where automatic recording of various cellular or other similar events is desired. It is contemplated that many changes and modifications may be made, by one of ordinary skill in the art, without departing from the spirit and scope of the invention as disclosed above.

We claim:

1. A digital image processing system for detecting specific shapes, comprising:
    (a) image gathering means for providing a series of electronic signals representing a series of visual images;
    (b) conversion means for converting each of said electronic signals to a digital representation and for modifying said digital representation according to external commands;
    (c) memory means for storing each said digital representation as an array of pixels, each of said pixels including a value representing gray shading for a unit of said visual image;
    (d) processing means coupled to said memory means and to said conversion means for issuing said commands to said conversion means and for detecting and analyzing changes in successive said digital representations;
    (e) processing means further comprising means for transforming each said digital representation by:
        (i) dilating said digital representation by a series of first structuring elements to provide a dilated digital representation;
        (ii) subtracting said dilated digital representation from said digital representation, for identification of high contrast portions of said visual image;
        (iii) threshold comparison of said high contrast portions by comparing the gray value of each of said pixels of said high contrast portions with a first reference value, replacing the gray values for each of said pixels whose value exceeds or equals said first reference value with a first fixed gray value and replacing the gray values for each of said pixels whose value is less than said first reference value with a second fixed gray value to provide a first threshold image;
        (iv) performing an annulus transformation on said first threshold image to create an annulustransformed image by:
            (1) determining a numerical value for the degree of coincidence between pixels having said first fixed gray value in said first threshold image and masks having annular patterns of pixels, said numerical value representing a degree of ring closure, and
            (2) storing in said memory means the numerical value for said degree of ring closure and coordinates corresponding to the center of each of said annular masks;
        (v) performing a ring-toss transformation on said annulus-transformed image to create a ring-toss transformed image by:
            (1) generating a pattern of pixels by dilation of said annulus-transformed image by a second annular structuring element, and
            (2) subtracting said dilated annulustransformed image from said annulustransformed image;
        (vi) generating a second threshold image by threshold comparison of said ring-toss transformed image by comparing the gray value of each of said pixels of said ring-toss transformed image with a second reference value, replacing the gray values for each of said pixel whose value exceeds or equals said second reference value with a third fixed gray value and replacing the gray values in each of said pixels whose value is less than said second reference value with a fourth fixed gray value;

(vii) storing said second threshold image in said memory means;

(f) means for comparing successive second threshold images of said transformed digital representations to detect appearances of said specific shapes.

2. The image processing system of claim 1 wherein said processing means comprises reading means for reading said digital representations from said memory.

3. The image processing system of claim 2 wherein said processing means comprises writing means for writing said digital representations to said memory.

4. The image processing system of claim 3 wherein said processing means includes logic means for generating structuring elements, said structuring elements including a specific pattern of bits.

5. The image processing system of claim 4 wherein said processing means comprises logic means for executing logic operations including the functions of logical AND, OR, NOT and exclusive-OR.

6. The image processing system of claim 5 further comprising mass storage means coupled to said processing means for permanent storage of data.

7. The image processing system of claim 6 wherein said processing means comprises logic means for creating lists of data in said memory.

8. The image processing system of claim 7 wherein said processing means comprises searching means for identifying particular elements in said lists of data.

9. The image processing system of claim 8 further comprising an input means coupled to said processing means whereby parameters supplied by a user may be stored in said memory.

10. The image processing system of claim 9 wherein said processing means comprises control means for issuing commands to said conversion means.

11. The image processing system of claim 10 wherein said control means comprises sequencing means for reading a series of instructions from said memory for transmission to said conversion means.

12. The image processing system of claim 11 wherein said processing means further comprises arithmetic means for execution of arithmetic operations including ADDITION, SUBTRACTION, MULTIPLICATION and DIVISION.

13. A method for identifying and recording the appearance of specific objects as digital representations of a series of visual images in a digital image processing system, said objects including patterns of pixels, comprising the steps of:

(a) converting each said visual image into a digital representation;

(b) providing memory means for storage of each said digital representation as an array of pixels, each pixel including a value representing gray shading for a unit of said visual image;

(c) transforming said digital representation by:

(i) dilating said digital representation by a series of first structuring elements to provide a dilated digital representation;

(ii) subtracting said dilated digital representation from said digital representation, for identification of high contrast portions of said visual image;

(iii) threshold comparison of said high contrast portions by comparing the gray value of each of said pixels of said high contrast portions with a first reference value, replacing the gray values for each of said pixels whose value exceeds or equals said first reference value with a first fixed gray value and replacing the gray values for each of said pixels whose value is less than said first reference value with a second fixed gray value to provide a first threshold image;

(iv) performing an annulus transformation on said first threshold image to create an annulustransformed image by:

(1) determining a numerical value for the degree of coincidence between pixels having said first fixed gray value in said first threshold image and masks having annular patterns of pixels, said numerical value representing a degree of ring closure, and (2) storing in said memory means the numerical value for said degree of ring closure and coordinates corresponding to the center of each said annular masks;

(v) performing a ring-toss transformation on said annulus-transformed image to create a ring-toss transformed image by:

(1) generating a pattern of pixels by dilation of said annulus-transformed image by a second annular structuring element, and (2) subtracting said dilated annulustransformed image from said annulustransformed image;

(vi) generating a second threshold image by threshold comparison of said ring-toss transformed image by comparing the gray value of each of said pixels of said ring-toss transformed image with a second reference value, replacing the gray values for each of said pixels whose value exceeds or equals said second reference value with a third fixed gray value and replacing the gray values in each of said pixels whose value is less than said second reference value with a fourth fixed gray value;

(vii) storing said second threshold image in said memory means;

(d) comparing successive said transformed digital representations to detect appearances of said objects;

(e) recording appearances of said objects; and (f) displaying appearances of said objects.

14. The method as defined by claim 13 wherein said second threshold image is used to update said digital representation stored in said memory means, using a logical OR operation.

15. The method as defined by claim 14 further comprising the step of isolating significant objects in said digital representation by connectivity number.

16. The method as defined in claim 15 further comprising the step of creating a temporal vicinity list in said memory, said temporal vicinity list comprising:

coordinates of an identified object;

a degree of ring closure of said object;

a first time said object was first detected;

a second time said object was last detected; and an index in said temporal vicinity list of another object to which said identified object is paired.

17. The method as defined in claim 16 further including the step of pairing said identified objects by storing the coordinates of each object in the pair in the temporal vicinity list entry of the other object in said pair.

18. The method as defined in claim 17 wherein said pairing is applied only to objects within a specific number of pixels of each other.

19. The method as defined in claim 18 wherein said pairing takes place between the identified object and the nearest other object when more than one object is within said specific number of pixels.

20. The method as defined in claim 19 further including the step of recording all incidences of said pairing on said mass storage means.

21. The method as defined in claim 20, further including the step of updating said temporal vicinity list for each of said objects identified in said binary representation.

22. The method as defined in claim 21 wherein said updating includes searching said temporal vicinity list for other objects within a specified proximity of said identified object, adding said identified object to the temporal vicinity list if no such other object is found and, if such other object is found, storing the coordinates and degree of ring closure information for said object in the node for said identified object in the temporal vicinity list.

23. The method as defined in claim 22 further including the step of scanning said temporal vicinity list for objects which have aged, such aging occurring when said object is last identified more than a specified time prior to the current visual image being processed.

24. The method as defined in claim 23 further including the step of deleting from said temporal vicinity list all of said objects which have aged and are not paired with another object.

25. The method as defined in claim 24 further including the step of deleting paired objects only when both objects in said pair have aged.

26. The method as defined in claim 25 further including the step of displaying for the use all incidences of said parings on said display means.

27. A digital image processing system as in claim 12, comprising means for recording appearances of said specific shapes.

28. A digital image processing system as in claim 27, comprising means for displaying appearances of said specific shapes.

29. A pattern recognition system for detecting annular objects in visual images, each of said visual images having been converted to a digital representation as an array of pixels stored in a memory means, each of said pixels having an associated numerical value representing gray shading, comprising: means for transforming each said digital representation by:
   (a) dilating said digital representation by a series of first structuring elements to provide a dilated digital representation;
   (b) subtracting said dilated digital representation from said digital representation, for identification of high contrast portions of said visual image;
   (c) threshold comparison of said high contrast portions by comparing the gray value of each of said pixels of said high contrast portions with a first reference value, replacing the gray values for each of said pixels whose value exceeds or equals said first reference value with a first fixed gray value and replacing the gray values for each of said pixels whose value is less than said first reference value with a second fixed gray value to provide a first threshold image;
   (d) performing an annulus transformation on said first threshold image to create an annulus-transformed image by:
      (i) determining a numerical value for the degree of coincidence between pixels having said first fixed gray value in said first threshold image and masks having annular patterns of pixels, said numerical value representing a degree of ring closure, and
      (ii) storing in said memory means the numerical value for said degree of ring closure and coordinates corresponding to the center of each of said annular masks;
   (e) performing a ring-toss transformation on said annulus-transformed image to create a ring-toss transformed image by:
      (i) generating a pattern of pixels by dilation of said annulus-transformed image by a second annular structuring element, and
      (ii) subtracting said dilated annulus-transformed image from said annulus-transformed image;
   (f) generating a second threshold image by threshold comparison of said ring-toss transformed image by comparing the gray value of each of said pixels of said ring-toss transformed image with a second reference value, replacing the gray values for each of said pixels whose value exceeds or equals said second reference value with a third fixed gray value and replacing the gray values in each of said pixels whose value is less than said second reference value with a fourth fixed gray value;
   (g) storing said second threshold image in said memory means.

30. A pattern recognition system as in claim 29, comprising:
   (a) means for comparison of successive stored second threshold images of said transformed digital representation to detect appearance of objects in said second threshold images including:
      (i) means for updating said stored transformed digital representation using said second threshold image in a logical OR operation;
      (ii) means for identifying objects by isolating significant objects in said transformed digital representation based upon connectivity number of said objects;
      (iii) means for creating a temporal vicinity list in said memory, said temporal vicinity list comprising:
         coordinates of an identified object,
         a degree of ring closure of said object,
         a first time said object was first detected,
         a second time said object was last detected, and
         an index in said temporal vicinity list of another object to which said identified object is paired;
      (iv) means for pairing said identified objects by storing the coordinates of each object in the pair in the temporal vicinity list entry of the other object in said pair, wherein said pairing is applied only to objects within a specific number of pixels of each other, and wherein said pairing takes place between the identified object and the nearest other object when more than one object is within said specific number of pixels;
      (v) means for recording all instances of said pairing in said storage means;

(vi) means for updating said temporal vicinity list for each of said objects identified in said transformed digital representation, wherein said updating includes searching said temporal vicinity list for other objects within a specified proximity of said identified object, adding said identified object to the temporal vicinity list if no such other object is found and, if such other object is found, storing the coordinates and degree of ring closure information for said other object in a node for said identified object in the temporal vicinity list;

(vii) means for scanning said temporal vicinity list for objects which have aged, such aging occurring when said object is last identified more than a specific time prior to the current visual image being processed;

(viii) means for deleting from said temporal vicinity list all of said objects which have aged and are not paired with another object;

(ix) means for deleting paired objects from said temporal vicinity list only when both objects in said pair have aged; and (x) means for displaying all instances of said pairings.

31. A pattern recognition method for detecting annular objects in visual images, each of said visual images having been converted to a digital representation as an array of pixels stored in a memory, each of said pixels having an associated numerical value representing gray shading, comprising the steps of: transformation of said digital representation by:

(a) dilating said digital representation by a series of first structuring elements to provide a dilated digital representation;

(b) subtracting said dilated digital representation from said digital representation, for identification of high contrast portions of said visual image;

(c) threshold comparison of said high contrast portions by comparing the gray value of each of said pixels of said high contrast portions with a first reference value, replacing the gray values for each of said pixels whose value exceeds or equals said first reference value with a first fixed gray value and replacing the gray values for each of said pixels whose value is less than said first reference value with a second fixed gray value to provide a first threshold image;

(d) performing an annulus transformation on said first threshold image to create an annulus-transformed image by:

(i) determining a numerical value for the degree of coincidence between pixels having said first fixed gray value in said first threshold image and masks having annular patterns of pixels, said numerical value representing a degree of ring closure, and (ii) storing in said memory the numerical value for said degree of ring closure and coordinates corresponding to the center of each of said annular masks;

(e) performing a ring-toss transformation on said annulus-transformed image to create a ring-toss transformed image by:

(i) generating a pattern of pixels by dilation of said annulus-transformed image by a second annular structuring element, and (ii) subtracting said dilated annulus-transformed image from said annulus-transformed image;

(f) generating a second threshold image by threshold comparison of said ring-toss transformed image by comparing the gray value of each of said pixels of said ring-toss transformed image with a second reference value, replacing the gray values for each of said pixels whose value exceeds or equals said second reference value with a third fixed gray value and replacing the gray values in each of said pixels whose value is less than said second reference value with a fourth fixed gray value;

(g) storing said second threshold image in said memory.

32. A pattern recognition method as in claim 31, comprising the steps of:

(a) comparison of successive stored second threshold images of said transformed digital representation to detect the appearance of objects in said second threshold images;

(b) updating said stored transformed digital representation using said result of said transforming step in a logical OR operation;

(c) identifying objects by isolating significant objects in said transformed digital representation based upon connectivity number of said objects;

(d) creating a temporal vicinity list in said memory, said temporal vicinity list comprising:

(i) coordinates of an identified object, (ii) a degree of ring closure of said object, (iii) a first time said object was first detected, (iv) a second time said object was last detected, and (v) an index in said temporal vicinity list of another object to which said identified object is paired;

(e) pairing said identified objects by storing the coordinates of each object in the pair in the temporal vicinity list entry of the other object in said pair, wherein said pairing is applied only to objects within a specific number of pixels of each other, and wherein said pairing takes place between the identified object and the nearest other object when more than one object is within said specific number of pixels;

(f) recording all instances of said pairing in said memory;

(g) updating said temporal vicinity list for each of said objects identified in said transformed digital representation, wherein said updating includes searching said temporal vicinity list for other objects within a specified proximity of said identified object, adding said identified object to the temporal vicinity list if no such other object is found and, if such other object is found, storing the coordinates and degree of ring closure information for said other object in a node for said identified object in the temporal vicinity list;

(h) scanning said temporal vicinity list for objects which have aged, such aging occurring when said object is last identified more than a specific time prior to the current visual image being processed;

(i) deleting from said temporal vicinity list all of said objects which have aged and are not paired with another object;

(j) deleting paired objects from said temporal vicinity list only when both objects in said pair have aged; and (k) displaying all instances of said pairings.

* * * * *

UNITED STATES PATENT AND TRADEMARK OFFICE
CERTIFICATE OF CORRECTION

PATENT NO. : 4,724,543

DATED : February 9, 1988

INVENTOR(S) : Robert R. Klevecz and Beverly A. Eccles

It is certified that error appears in the above-identified patent and that said Letters Patent is hereby corrected as shown below:

Column 1, line 5, after the title, insert:

--This invention was made with government support under Grant No. GM31262 awarded by the National Institutes of Health. The government has certain rights in the invention.--

Signed and Sealed this

Sixteenth Day of February, 1993

Attest:

STEPHEN G. KUNIN

Attesting Officer

Acting Commissioner of Patents and Trademarks